United States Patent [19]

Norris et al.

[11] Patent Number: 4,869,421
[45] Date of Patent: Sep. 26, 1989

[54] METHOD OF JOINTING TITANIUM ALUMINIDE STRUCTURES

[75] Inventors: Brian Norris, San Diego; Romulo M. Martinez, Chula Vista; Francis J. Gojny, Bonita, all of Calif.

[73] Assignee: Rohr Industries, Inc., Chula Vista, Calif.

[21] Appl. No.: 208,985

[22] Filed: Jun. 20, 1988

[51] Int. Cl.⁴ .............................................. B23K 20/22
[52] U.S. Cl. .................................... 228/181; 228/194; 228/263.21
[58] Field of Search .................... 228/194, 263.17, 181, 228/263.21

[56] References Cited

U.S. PATENT DOCUMENTS

| | | | |
|---|---|---|---|
| 3,957,194 | 5/1976 | Woodward | 228/194 |
| 3,981,429 | 9/1976 | Parker | 228/194 |
| 4,024,617 | 5/1977 | McCormick | 228/194 X |
| 4,715,525 | 12/1987 | Norris | 228/194 |

FOREIGN PATENT DOCUMENTS 833758  4/1960  United Kingdom ........... 228/263.21

Primary Examiner—Kenneth J. Ramsey
Attorney, Agent, or Firm—Patrick J. Schlesinger; Frank D. Gilliam

[57] ABSTRACT

A method of diffusion brazing two or more titanium alloy metal parts, such as sheets, thick sections or a honeycomb core to one or two face sheets, to form a unitary panel. A low melting copper-nickel layer is interposed between the faying surfaces of two parts to be bonded. The layer may be a foil placed between the surfaces or may be a layer plated onto one or both surfaces. The assembly is heated to at least the eutectic melting temperature of the base metal-interlayer eutectic point for a time sufficient to permit effective wetting and diffusion bonding of the surfaces. The assembly is held at the elevated temperature a sufficient additional time so as to allow isothermal solidification to occur. The assembly is then cooled, resulting in a unitary structure. This method is particularly effective with titanium aluminides face sheets and a titanium aluminide or other titanium base honeycomb core and with an interlayer consisting essentially of nickel and copper.

2 Claims, 1 Drawing Sheet

METHOD OF JOINTING TITANIUM ALUMINIDE STRUCTURES

BACKGROUND OF THE INVENTION

This invention relates in general to the bonding of metal parts together and, more specifically, to the diffusion brazing of titanium based alloys together, such as face sheets and honeycomb cores.

Brazing is a very old and well known process for joining metal parts to each other. Typically, a layer of a metal having a lower melting temperature than the parts is interposed between the faying surfaces of the parts. The assembly is then heated to at least the melting temperature of the interlayer (or to the melting point of the interlayer-base metal eutectic) which melts, wets the faying surfaces and generally diffuses somewhat into those surfaces. While small parts can often be brazed using a torch and wire forming the interlayer as it is melted, larger and more complex structures are generally brazed in furnaces where temperature, pressure and atmosphere may be easily controlled. Upon cooling, a strong continuous joint is formed. Bonding aluminum or copper parts by such techniques is described, for example, by Bose et al. in U.S. Pat. No. 4,497,430 and Wells et al. in U.S. Pat. No. 3,581,382.

Attempts have been made to diffusion bond parts together without an added metal interlayer by very carefully cleaning the faying surfaces and pressing them forcefully together in an inert atmosphere or vacuum while heating the parts to a high temperature which is lower than the melting temperature of the parts. This process is discussed by Woodward in U.S. Pat. No. 3,957,194. This technique has not proved practical with large delicate assemblies, such as honeycomb core structural panels because of the difficulty in obtaining the necessary high surface cleanliness and maintaining uniform pressure during bonding and the probability of core crushing due to the high pressures involved.

Titanium aluminide alloys are very desirable for use in honeycomb core sandwich panels because of their high temperature strength and stiffness-to-weight ratios. It is impractical to bond these panels using diffusion bonding as the typical bonding pressures required (200 to 5000 psi) would crush the delicate honeycomb core or in the case of thick sections require expensive and complex tooling to provide the high pressure.

Titanium aluminide has been bonded using 0.001 to 0.002 inch titanium-copper-nickel brazing foil. This has several disadvantages in that the multi-layer laminate is difficult to roll down to the required thickness. The use of such braze foil in thicknesses greater than about 0.001 inch can result in an excess of brazing liquid that may erode the thin gauges of core foil (0.001 to 0.005 inch) typically used in honeycomb core.

Other possible bonding agents do not have the required high temperature resistance, toughness and bond line strength required for many applications. Other techniques for bonding titanium use complex and expensive interlayer foils, such as that described by Parker in U.S. Pat. No. 3,981,429.

Thus, there is a continuing need for an improved method of bonding titanium aluminide based alloys in applications such as the manufacture of honeycomb core panels.

SUMMARY OF THE INVENTION

The above noted problems, and others, are overcome by the method of this invention, in which the present brazing and diffusion brazing methods are improved by using an interlayer consisting essentially of alloys and/or layers of nickel and copper with titanium base parts, where at least one of the parts is titanium aluminide. This improvement is used in an overall method which consists of interposing the interlayer between the faying surfaces of the parts to be joined, heating the assembly under suitable conditions to a temperature at which the interlayer reacts with the base metal to cause eutectic melting, maintaining the temperature until the desired diffusion causes iso-thermal solidification, then cooling the assembly to produce a strong, well bonded joint.

The bonding process, which consists of heating the structure being joined to a temperature above the melting point of the eutectic of interlayer and base metal, generally is continued until isothermal solidification of the joint occurs. This process may also be termed "liquid interface diffusion" or "titanium aluminide liquid interface diffusion" bonding.

BRIEF DESCRIPTION OF THE DRAWING

Details of the invention, and of certain preferred embodiments thereof, will be further understood upon reference to the drawing, wherein.

DETAILED DESCRIPTION OF THE INVENTION

Figure 1:
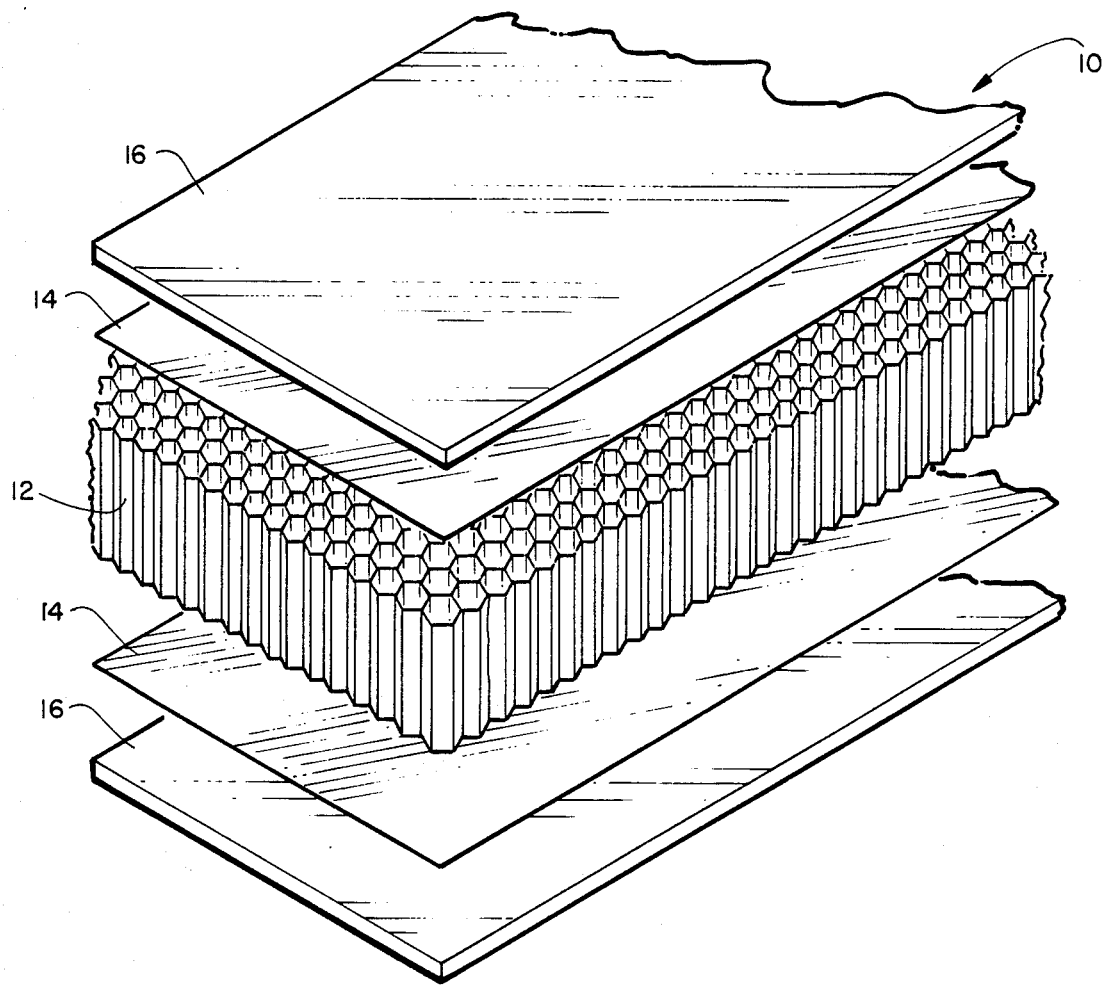
FIG. 1 is an exploded perspective view of an embodiment of the assembly of components as used in the method of this invention.

Referring now to FIG. 1, there is seen a perspective exploded view of an assembly 10 which includes a honeycomb core 12, a pair of metal foil interlayers 14 and a pair of face sheets 16. While the method of this invention is particularly adapted to producing high quality structural panels having a pair of face sheets bonded to a honeycomb core as seen in FIG. 1, other structures may be assembled using this method, if desired.

Honeycomb core 12 is formed from a titanium based alloy by any suitable manufacturing process. While core 12 may be formed from an alloy which consists primarily of titanium, titanium aluminides are strongly preferred for their high strength-to-weight ratio at elevated temperatures and other desirable physical and chemical properties, despite the difficulty of diffusion brazing them by prior methods. Typically, the titanium aluminide should comprise from about 20 to 80 atomic % titanium with the balance being aluminum. Minor alloying additions are also included in most alloys. Titanium aluminide alloys are available, for example, from Timet Inc under the Alpha 2, Gamma, Super Alpha 2 and Tau designations. While titanium is generally only useful at temperatures up to about 1100° F., titanium aluminide can be used at temperatures up to about 1500° F. and sometimes up to 1800° F.

Interlayers 14 are, in the embodiment shown, thin metal foils consisting essentially of nickel and copper. The eutectic of the interlayer with the titanium aluminide base metal has a melting temperature significantly lower than that of the base metal core 12 and base metal face sheets 16. The liquid eutectic wets those materials as it is being produceded. Interlayer 14 may be in a multilayer form with one or more thin layers of each constituent metal or may be in a uniform, homogeneous alloy form. Of these, the homogeneous form is preferred because it reacts with the base metal at a fixed temperature (and hence at a fixed time during heat-up). Multilayer laminates react with the base metal at different temperatures, depending upon which layer is in contact with, and reacting with, the base metal. This approach results in less available bonding liquid at any one time, which subsequently produces weaker joins.

For best results, an interlayer 14 should include from about 20 to 80 wt % nickel, the balance being copper. Optimum results are generally obtained with about 50 wt % copper and 50 wt % nickel.

While structuring interlayer 14 in foil form as shown in FIG. 1 is preferred in many cases, other arrangements may be used, if desired. For example, interlayer 14 may be electrodeposited on the faying surface or either or both face sheets 16 or core 12, if desired or by powder deposition, plasma spraying, or vapor deposition or the like. Generally, the thickness of interlayer 14 should be in the 0.000025 to 0.003 inch range for the best combination of maximum strength and minimum weight. Optimum results are obtained with a homogeneous alloy interlayer thickness of about 0.0002 inch.

Face sheets 16 should be of titanium aluminide alloys of the sort discussed above. This alloy provides superior physical and mechanical properties, including high temperature strength and high stiffness-to-weight ratios together with excellent resistance to attack by oxygen. The optimum alloy proportions is the same for face sheets 12 as was specific for core 12, above. In most cases, face sheets 16 and core 12 should have the same composition for uniformity of thermal expansion and other characteristics.

The method of this invention, basically, is performed by cleaning the surfaces to be joined, stacking the components as shown in FIG. 1, placing the resulting assembly in an oven, pressing the assembled stack together, heating the assembly in an inert atmosphere or vacuum to at least the melting temperature of the eutectic of the interlayer 14 with the base metal (and preferably slightly higher). The assembly is held at that temperature for a selected period to allow complete wetting of the faying surfaces and the desired degree of diffusion into the surfaces to allow isothermal solidification, then the assembly is cooled, producing a uniform, high strength join.

The assembly must be maintained in a substantially oxygen-free atmosphere during heating, typically in a vacuum or an inert gas atmosphere such as very pure argon. The assembly may be heated to a temperature in the range of from about 1600° to 2000° F. for a suitable time to permit eutectic melting of the interlayer and the desired degree of diffusion. Optimum results are obtained at about 1850° F. The parts may be held at the selected temperature for a time period between 30 minutes and 16 hours, with shorter times being used with higher temperatures and where less diffusion is desired. In general, optimum bonding with lowest energy cost and time is obtained at 1850° F. with that temperature being held for about 90 minutes. The parts are then cooled below the reactive range, preferably below about 600° F. and removed from the furnace.

Figure 2:
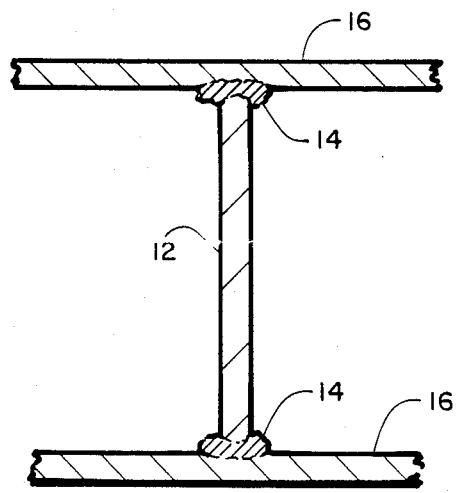
FIG. 2 is a schematic detail section view taken perpendicular to the surface of the assembly showing a second interlayer configuration.
Figure 3:
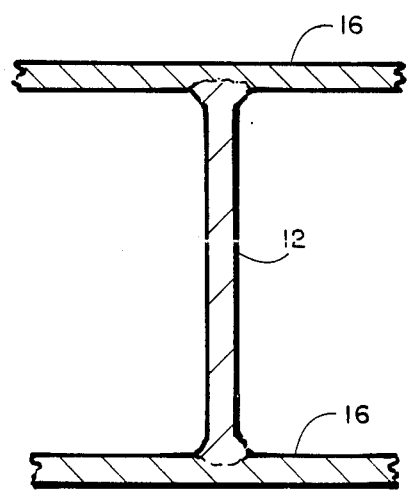
FIG. 3 is a schematic detail section view of the second embodiment taken perpendicular to the assembly surface after brazing.

FIG. 2 shows a detailed schematic section view of a portion of another embodiment of assembly 10, taken perpendicular to face sheets 16. Here, interlayer 14 is electrodeposited, such as by dip electroplating, on the edges of the core honeycomb. When core 12 and face sheets 16 are brought together under moderate pressure and heated to the melting temperature of interlayer 14, the eutectic nickel-copper layer melts and diffuses somewhat into the adjacent face sheet and core edge regions. Isothermal solidification occurs, then the assembly is cooled, forming a smooth joint with narrow radii fillets 18 as seen in FIG. 3.

Details of the invention will be further appreciated upon reference to the following examples which illustrate certain preferred embodiments of the method of this invention. Parts and percentages are by weight unless otherwise indicated.

EXAMPLE I

A titanium aluminide honeycomb core formed from 0.005 inch foil and having a core thickness of about 0.5 inch and made up of about 75 atomic % titanium and 25 atomic % aluminum (about 84 wt titanium and 16 wt % aluminum) is provided. A homogeneous foil interlayer having a thickness of about 0.0002 inch and containing about 50 wt % nickel and the balance copper is placed on each side of the core. Sheets of titanium aluminide each about 0.040 inch thick, available from the Timet Company under the Alpha 2 designation are placed on both sides of the core and interlayer assembly. The resulting assembly is placed in an oven and pressed together with a pressure of about 0.3 psi. The oven is heated in a pure argon atmosphere to about 1850° F., the eutectic melting point of the interlayer and core. That temperature is maintained for about 90 minutes, then the assembly is returned to room temperature. Examination of the joints show uniform, sturdy bonding with even, smooth fillets and no unbonded regions.

EXAMPLE II

A titanium honeycomb core, fabricated from 0.003 inch titanium foil and having a core thickness of about 0.5 inch is provided. The core is carefully washed with trichlorethylene and lightly etched with nitric acid. The edges of the core are then electroplated with a 0.00025 inch layer of copper, then with a 0.00025 inch layer of nickel, then with a second 0.00025 inch layer of copper. Two similarly cleaned face sheets, each consisting of about 75 atomic % titanium and 25 wt % aluminum having thicknesses of about 0.020 inch, are brought into contact with the plated layers in a furnace in a vacuum and pressed together at a pressure of about 0.3 psi and are heated to about 1850° F. and maintained at that temperature for about 80 minutes. The assembly is then cooled to room temperature and removed from the furnace. An excellent join results.

EXAMPLE III

A titanium aluminide honeycomb core formed from 0.005 inch foil and having a core thickness of about 0.7 inch and made up of about 50 atomic % titanium and 50 atomic % aluminum and containing an added 5 vol % titanium diboride particulates is provided. A homogeneous foil having a thickness of about 0.0002 inch and containing about 50 wt % nickel and the balance copper is placed on both sides of the core. Sheets of titanium aluminide each about 0.040 inch thick, available from Martin Marietta Laboratories under the T-71 designation are placed on both sides of the core. The resulting assembly is placed in an oven and pressed together with a pressure of about 0.4 psi. The oven is evacuated to about $5 \times 10^{-4}$ torr and is heated to about 1900° F., above the melting temperature of the foil and eutectic of foil and base metal. The temperature is maintained for about 80 minutes, then the assembly is returned to room temperature. Examination of the joins show a complete seal at the core nodes and sturdy bonding with even, smooth fillets and no unbonded regions at the core to face sheet interface.

EXAMPLE IV

A titanium aluminide core formed from 0.003 inch foil and having a core thickness of about 0.4 inch and made up of an alloy consisting of about 50 at % titanium and 50 at % aluminum is provided. A homogeneous layer having a thickness of about 0.0002 inch and containing about 50 wt % copper and 50 wt % nickel is placed on each side of the core. Sheets of titanium aluminide each about 0.090 inch thick, available from the Timet Company under the Gamma designation are placed on both sides of the core assembly. The resulting assembly is placed in an oven and pressed together with a pressure of about 0.3 psi. The oven is evacuated to about $5 \times 10^{-4}$ torr and is heated to about 1900° F., above the melting temperature of the foil-base metal eutectic. That temperature is maintained for about 90 minutes, then the assembly is returned to room temperature. Examination of the joins show uniform, sturdy bonding with even, smooth fillets and no unbonded regions.

EXAMPLE V

A titanium aluminide stiffener machined into an I-beam section with wall thicknesses of about 0.090 inch, made from a Timet Company Gamma alloy, is provided. A homogeneous foil having a thickness of about 0.0002 inch and containing about 50 wt % each of copper and nickel is placed on the faying surface of the stiffener and held in position by spaced spot welded tabs. A sheet of titanium aluminide about 0.080 inch thick is placed over the foil and held in place by resistance spot welds. The resulting assembly is placed in an oven and pressed together with a pressure of about 2 psi. The oven is evacuated to about $5 \times 10^{-4}$ torr and is heated to about 1900° F., above the melting temperature of the eutectic between the foil and base material. After about 80 minutes at that temperature, the assembly is cooled below about 600.F and removed from the oven. Examination of the bond joint shows sturdy bonding and no unbonded regions.

EXAMPLE VI

Titanium aluminide (50 atomic % titanium and 50 atomic % aluminum) honeycomb core made of 0.003 inch foil and having a core thickness of about 0.25 inch is provided. A titanium aluminide tube is plasma sprayed with a 50 wt % nickel, 50 wt % copper powder to form a layer having a thickness of about 0.001 inch. The coated surface of the tube is placed in contact with one side of the core (which is configured to match the tube) and a sheet of 50 wt % copper, 50 wt % nickel foil having a thickness of about 0.0007 inch is placed on the opposite side of the core, then a sheet of titanium aluminide (50 atomic % titanium, 50 atomic % aluminum) having a thickness of about 0.06 inch is placed over the foil. All components are carefully cleaned prior to assembly. The resulting assembly is placed in an oven and pressed together at about 0.5 psi. The oven is evacuated to a pressure together at about $1 \times 10^{-4}$ torr and heated to about 1880° F. for about 135 minutes to diffuse the interlayer liquid into the mating surfaces until isothermal solidification occurs. The structure is then returned to room temperature and removed from the oven. Examination shows a well bonded unitary structure having smooth sound fillets, suitable for use as a regeneratively or actively cooled structure for aerospace vehicles.

The above examples provided of certain preferred embodiments. The material, structures and conditions described therein may be varied, where suitable with similar results. Those variations are included within the scope of this invention to the extent specified in the following claims.

We claim:

1. The method of joining titanium aluminide honeycomb cores to titanium aluminide face sheets which comprises the steps of:

providing a honeycomb core and at least one face sheet, each consisting essentially of titanium aluminide having from about 20 to 80 atomic % titanium with the balance being aluminum;

cleaning the faying surfaces of said core and at least one face sheet;

interposing an interlayer foil between said faying surfaces;

said foil having a thickness of about 0.0002 inch and consisting essentially of about 50 wt % nickel with the balance being copper;

pressing the resulting assembly together in a furnace in a substantially oxygen-free atmosphere;

heating said assembly to a temperature of about 1850° F.; and maintaining that temperature for a period sufficient to permit liquid eutectic formation followed by an isothermal solidification to occur;

cooling said assembly to a temperature below about 600° F.; and removing the resulting joined assembly from said furnace.

2. The method according to claim 1 wherein said temperature of 1850 degrees is held for about 90 minutes.

* * * * *